United States Patent [19]

Adams

[11] Patent Number: 4,891,709

[45] Date of Patent: Jan. 2, 1990

[54] FLEXIBLE FORMATTING INTERFACE FOR PICTORIAL DATA TRANSFER

[75] Inventor: Andrew D. Adams, Bedford, Mass.

[73] Assignee: Eastman Kodak Company, Rochester, N.Y.

[21] Appl. No.: 332,343

[22] Filed: Mar. 31, 1989

[51] Int. Cl.[4] .............................................. H04N 1/00
[52] U.S. Cl. .................................... 358/256; 358/434; 358/443
[58] Field of Search ............... 358/256, 257, 280, 284; 340/703, 744

[56] References Cited

U.S. PATENT DOCUMENTS

| | | | |
|---|---|---|---|
| 3,603,962 | 9/1971 | Lechner | 340/703 |
| 4,206,457 | 6/1980 | Weisbecker et al. | 340/703 |
| 4,364,037 | 12/1982 | Walker | 340/744 |
| 4,425,559 | 1/1984 | Sherman | 340/747 |
| 4,490,797 | 12/1984 | Staggs et al. | 340/703 |
| 4,689,613 | 8/1987 | Ikeda | 340/703 |
| 4,719,503 | 12/1988 | Craver et al. | 340/703 |
| 4,811,416 | 3/1989 | Nakamura | 382/41 |
| 4,814,890 | 3/1989 | Kato | 358/257 |
| 4,817,050 | 3/1989 | Komatsu et al. | 358/280 |

FOREIGN PATENT DOCUMENTS

WO87/07972 12/1987 PCT Int'l Appl. .

Primary Examiner—Edward L. Coles, Sr.
Attorney, Agent, or Firm—Nutter, McClennen & Fish

[57] ABSTRACT

In a pictorial information processor/previewer system including one or more graphic input/output devices, a flexible, bi-directional, interface utilizing a system of latches controlled by a high speed state machine, which performs system handshakes and synchronization, as well as formatting or sequencing, of the transmission of pictorial data, according to a selection among a plurality of software-selectable modes of operation.

11 Claims, 11 Drawing Sheets

| STARTING ADDRESS (hex) | CONTENTS |
|---|---|
| 0x000 | Mode 0 |
| 0x080 | Mode 1 |
| 0x100 | Mode 2 |
| 0x180 | Mode 3 |
| 0x200 | Mode 4 |
| 0x280 | Mode 5 |
| 0x300 | Mode 6 |
| 0x380 | Mode 7 |
| 0x400 | Mode 8 |
| 0x480 | Mode 9 |
| 0x500 | Mode 10 |
| 0x580 | Mode 11 |
| 0x600 | Mode 12 |
| 0x680 | Mode 13 |
| 0x700 | Mode 14 |
| 0x780 | Diagnostic Mode |

FLEXIBLE FORMATTING INTERFACE FOR PICTORIAL DATA TRANSFER

FIELD OF THE INVENTION

This invention is generally related to the field of computer-aided preparation of pictorial information for printing processes. The invention provides a flexible means of interfacing digital information storage with output from pictorial digitizing devices and input to film writing devices according to a selection among a plurality of software-selectable modes of operation, allowing formatting or sequencing of the transmitted information and handling of transmission handshake protocols.

BACKGROUND OF THE INVENTION

The graphic arts industry, including the printing industry, has increasingly automated its means for generating plates for printing of pictures in line, black-and-white halftone and in color. In common use today are devices known as "scanners," in which an original image or "copy" is placed on a rotating drum and scanned for reflected light intensity within defined areas (screen analogs) serving as pictorial elements or "pixels." (By using different colors of incident light, or by filtering, color separation may be achieved for color printing). The information is generally reproduced on a plate or film, often on the same rotating drum, by a writing mechanism such as a laser. As an intermediate step, the information may be further processed, for example, rotated to simulate traditional mechanical screen separation. In the scanners commercially available today, certain portions of this information processing are incorporated within the scanner/writer device.

Because it is desirable to perform additional processing of the pictorial information, such as that allowing picture enhancements, corrections and page layout and make-up, it is common to load the data output of the scanner device into a separate mini- or microcomputer (and related storage devices) to allow processing and previewing of the image to be written.

The data output of a typical scanner are digital, multibit, representations of intensities of scanned colors, typically, Red, Green, and Blue ("R", "G", and "B"), for each pixel, plus additional data for image enhancement known as an "Unsharp Mask" or "USM." Each multibit representation of a color intensity for a pixel may be called a "pixel value."

Input to the writer portion of a scanner/writer typically include pixel values for each of the Yellow, Black, Cyan and Magenta separations. The separations may be generated "simultaneously" on contiguous regions of the drum, e.g., in "two up" or "four up" configurations, with each scan writing a line (sometimes called a "subline") of each of the multiple separations.

Transmission of data to and from the input/output device is usually accompanied by a "handshake." In the case of synchronous transmission, this may be a "request" signal accompanying data transmission, with the negating of the request signifying the end of a particular transmission. In asynchronous transmission, the handshake may be a request from the transmitting device and an "acknowledgement" from the receiving device.

Because many pixels are required to provide acceptable resolution, and there may be multiple pixel values for each pixel, it can be seen that a high rate of data transfer is required in order to scan and write within a reasonably limited period of time. This data rate is generally greater than that which can be handled by most processors. Therefore, intermediate storage means, or "buffers," may be employed in both the scanning and writing phases of pictorial information processing.

Different input and output devices may use different data formats and buses (8 or 16 bits) and different data transfer handshake protocols (synchronous or asynchronous). Examples of input and output devices other than scanner/writers include line art digitizers and plotters.

Previously, the interface between the graphic input/output device and the information processor was "dedicated" to the input/output device, allowing for high speed data transfer. A change in the input/output device would require a different interface and perhaps rewiring within the input/output device. If, for example, only blue values were to be captured, such editing would have to occur at the processor level, wasting the transmission bandwidth in transmission of the Red, Green and USM information.

It is a purpose of the present invention to provide a flexible, but efficient, interface between a graphic input/output device and an information processing and previewing system. The present invention allows interface with input/output devices with different data formats and handshake protocols with no rewiring. The invention further allows rearrangement of the pictorial data in a format that maximizes the rate of transmission, for example, by eliminating the USM information, which often is not used at the processor level.

SUMMARY OF THE INVENTION

In summary, the invention provides a flexible interface between graphic input/output devices and intermediate storage for pictorial data through a system of bidirectional latches connected to the input/output data bus and controlled by a high speed "state machine" which is programmable and pre-programmed to operate in multiple, software-selectable, modes corresponding to interface requirements.

In the input mode, pictorial data from the input device, in the form of one or more pixel values, received in parallel bits on the input/output data bus are latched in one or more (if there is more than one pixel value) of the latches, then transmitted on a second bus in a pixel value sequence according to the state machine program corresponding to the selected mode of operation. The information may then be stored in a "first-in first-out" or FIFO buffer and possibly an additional intermediate term storage device such as a disk drive pending further transmission to a processor/previewer subsystem.

If an output mode is selected, pictorial data transmitted to the latches from the FIFO buffer on the second bus may be latched for rearrangement and transmission on the input/output data bus to the input/output device. Data transmission handshakes with the input/output device are synchronized by the invention with the system clock to allow high speed internal transmission of pictorial data to and from the FIFO buffer, and thus, efficient capture of the pictorial data.

Thus, by selecting the appropriate mode corresponding to a certain mode of operation of an input/output device, the interface will handle transmission handshakes for and synchronization of data transmission in either direction between the input/output device and the intermediate storage means. By selecting the appropriate mode, certain pixel values may be deleted or rearranged in the sequence of their transmission.

The invention has the advantage of being easily changed to interface to a wide variety of input/output devices and data formats with no expensive changes to "dedicated" hardware design and manufacture. Since the invention controls both the data transfer handshake and the formatting of data values, many types of devices may be interfaced with just a change in the selection of the mode of the state machine. In the illustrative embodiment, the state machine comprises registered programmable read-only memories ("PROMs"), which are easily programmed using standard techniques. The mode of operation of the invention is selected electrically, typically by the system software.

Also, the invention may be programmed to meet the data format needs of the information processor/previewer subsystem. Formatting the data with software in the processor/previewer subsystem would be very time consuming and wasteful. The invention allows formatting of the scanned pixel values before transfer to the buffer within the input bus clock cycle, thus without compromising the rate of data throughput. Similarly, the invention allows formatting of pixel values to be written from the buffer with no compromise in output speed. The registered PROM state machine implementation allows very high speed data transfer. Bandwidths of approximately 6 Mbytes/second have been achieved with the illustrative embodiment.

BRIEF DESCRIPTION OF THE DRAWINGS

In order that the invention may be more clearly understood, reference is made to the accompanying drawings which show the illustrative embodiment and details of its operation.

DETAILED DESCRIPTION OF AN ILLUSTRATIVE EMBODIMENT

Figure 1:
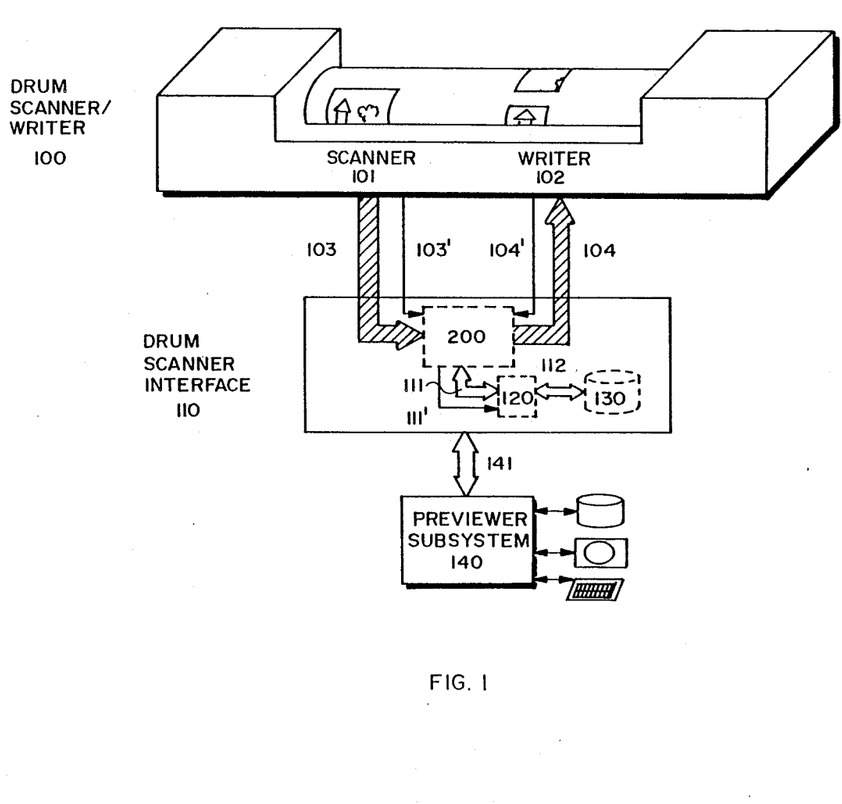
FIG. 1 depicts a scanner/writer and previewing system in which the invention is used.

FIG. 1 shows the functional components of a pictorial information processor/previewer system utilizing the present invention. A drum scanner/writer 100 integrates a scanner 101 and a writer 102. Data from scanner 101, including pictorial information typically are transmitted out of the scanner/writer 100 via cable or bus 103 in parallel. Typically, the data is transmitted 16 data bits at a time, thereby accommodating two pixel values of 8 bits each. (A line art digitizer may only have 8 data bits.) Handshakes are initiated on line 103' (which may be included within cable 103 as two lines) by the scanner 101 and may be acknowledged on additional lines (not shown) returning to the scanner 101.

The present invention, which may be described loosely as a "pixel formatter," is shown as component 200 of the drum scanner interface 110. Data transmitted from scanner 101 on cable 103 is sequenced and synchronized for transmission on an internal bus 111 to a FIFO buffer 120. The data may be transferred subsequently to a mass storage device such as the disk drive 130. The processor/previewer subsystem 140 subsequently copies the data on disk drive 130 for subsequent manipulation and modification.

When it is desired to write the processed data using writer 102, an output mode is selected on the pixel formatter 200, and data is transferred from disk drive 130 to the FIFO buffer 120, through the pixel formatter 200 and over the output cable or bus 104 to writer 102. Typically, the writer 102 is the "bus master," and makes requests for transmission on line(s) 104', which may be part of cable 104.

Figure 2:
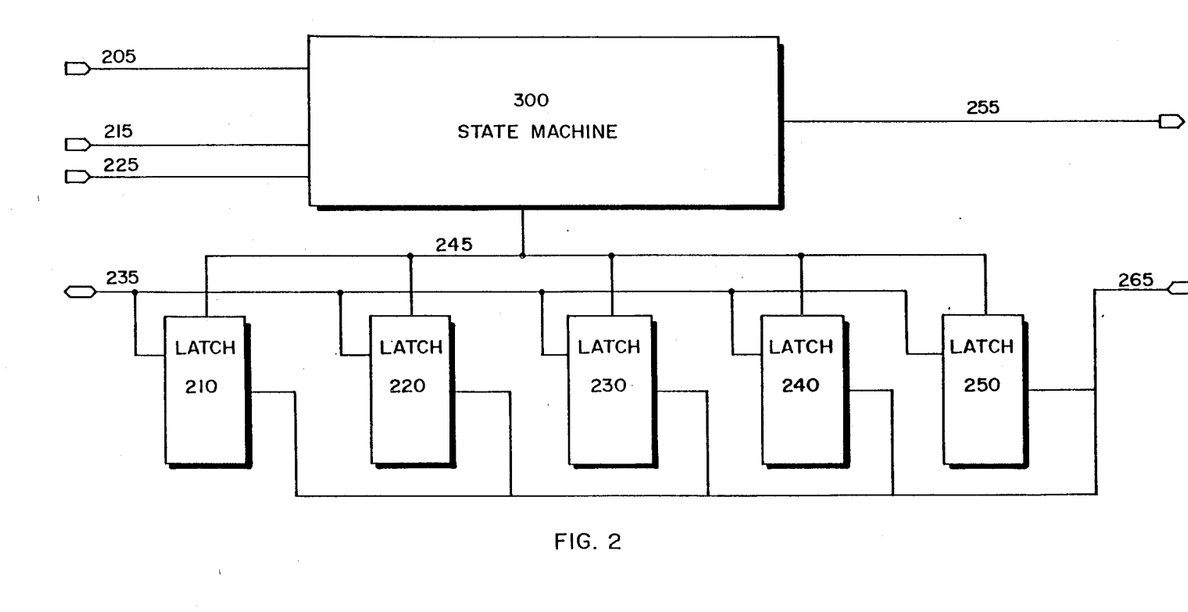
FIG. 2 is a block diagram of the illustrative embodiment of the invention.

FIG. 2 shows is a block diagram of the illustrative embodiment of the invention shown as pixel formatter 200 in FIG. 1. Eight-bit latches 210, 220, 230, and 240 in the typical input mode, are respectively assigned to R, G, B, and USM data. Eight-bit latch 250 is used as a "remainder" latch to allow pairing of pixel values (when odd numbers of colors are to be captured) for writing into the FIFO buffer 120 (in FIG. 1), which, as explained in the discussion below of FIG. 5E, is organized into memory locations of two bytes or 16 bits.

Since the USM data typically is not used, one mode of data transmission would be to latch the R and G data into latches 210 and 220 respectively, then the B and USM data into latches 230 and 240 respectively. The contents of latches 210 and 220 are then written to the FIFO buffer 120 (FIG. 1), while the contents of latch 230 are held for pairing with another pixel value. For example, if the R and G values for the next pixel scanned are latched into latches 210 and 220 respectively, the B value for that pixel is latched into the remainder latch 250, keeping the B value for the previous pixel intact in latch 230 (the USM value in latch 240 may simply be overwritten). The contents of latch 230 are then paired with the contents of latch 210 and written to FIFO buffer 120 (FIG. 1), followed by the contents of latch 220 and remainder latch 250 to complete the cycle. The example is explained in further detail with the discussion below of FIG. 6.

In the illustrative embodiment, only latches 210 and 220 are bi-directional, since only two pixel values were required in the particular output mode. Modes are selected on the four-bit line 215, allowing for 16 modes. Input modes may include RGB (in sequence), R only, G only or B only. Output modes may include multiple images such as "one up," "two up," or "four up."

Figure 3:
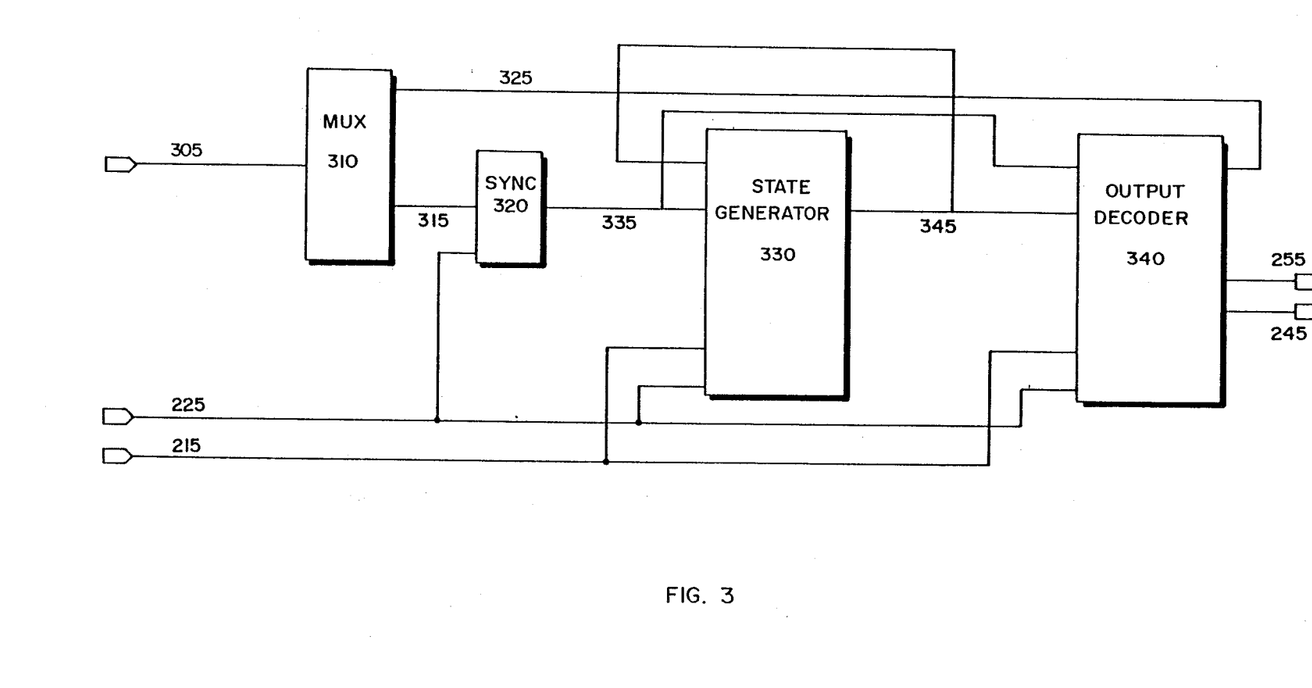
FIG. 3 is a block diagram of the state machine portion of the illustrative embodiment of the invention.

FIG. 3 is a block diagram of the state machine portion of the pixel formatter 200. With "state" defined as a set of values measured at selected parts of a circuit, such as the outputs, a state machine is one which progresses through a sequence of states, with each transition to a new state determined by the current state plus other input conditions. In FIG. 3, the current state is defined at lines 345, which are outputs of a state generator 330, according to the mode selected on lines 215.

Still referring to FIG. 3, the condition code select signals on lines 325, through multiplexer 310, select the signal on one of lines 305 as a condition code signal to appear on line 315. Lines 305, further specified in FIG. 5A and discussed below, include transmission request and diagnostic signal lines. The condition code signal selected on line 315 is synchronized by a D-type flip-flop 320 to be input on line 335, along with the present state on lines 345, to the state generator 330. At the next clock pulse on line 225, a transition is or is not made to a new state, according to the present state, the condition code and the mode selected on lines 215. The same three values are inputs to an output decoder 340 to generate output signals on lines 245 (which control the operation of the latches (FIG. 2)), the condition code select signals on lines 325, and the signals on lines 255 (which control other portions of the system, such as the FIFO buffer, as described in further detail below).

In the illustrative embodiment, the pixel formatter is strobed by a 20 MHz clock signal on line 225 in FIGS. 2, 3, 5A and 5B. The clock frequency is several times the frequency of pixel values arriving on the input/output data bus 235, allowing for formatting without compromising the rate of data throughput. Operation at this speed is possible through the use, for example, of the simple state machine of the illustrative embodiment, implemented with registered PROMs for the state generator 330 and output decoder 340 (FIG. 3). The synchronization D-type flip-flop 320 is strobed by line 225 to pass a condition code signal on line 335 to the registered PROM state generator 330 synchronously with the clocking of the entire pixel formatter subsystem 200 (FIG. 1), including the state generator 330 and the output decoder 340 (FIG. 3).

Figure 4A:
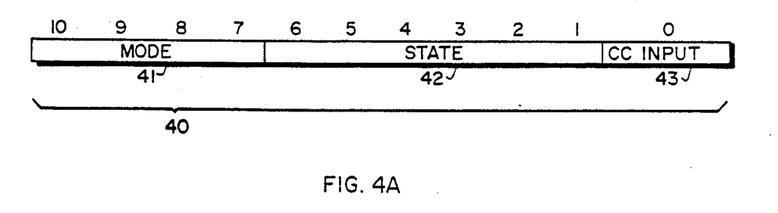
FIG. 4A depicts the address structure of the registered PROMs used in the state machine portion of the illustrative embodiment of the invention.
Figure 4B:
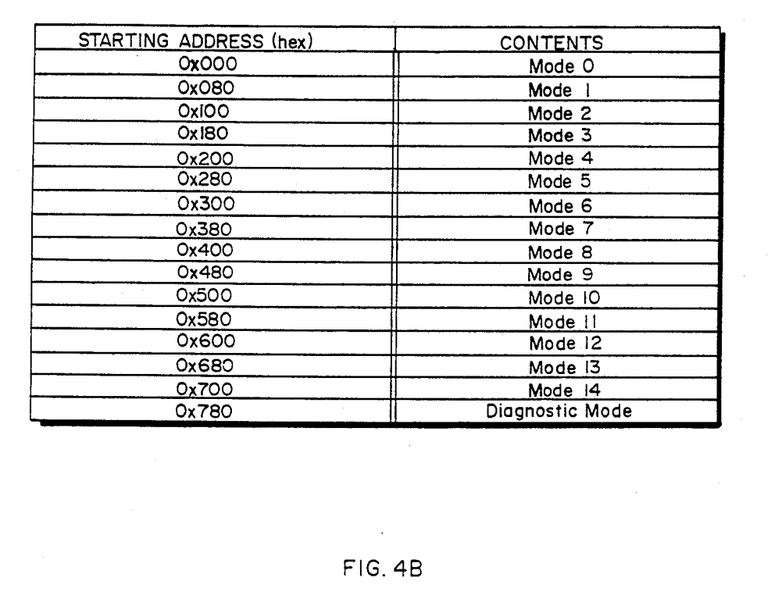
FIG. 4B depicts the PROM address map of the registered PROM used in the state machine portion of the illustrative embodiment of the invention.
Figure 5A:
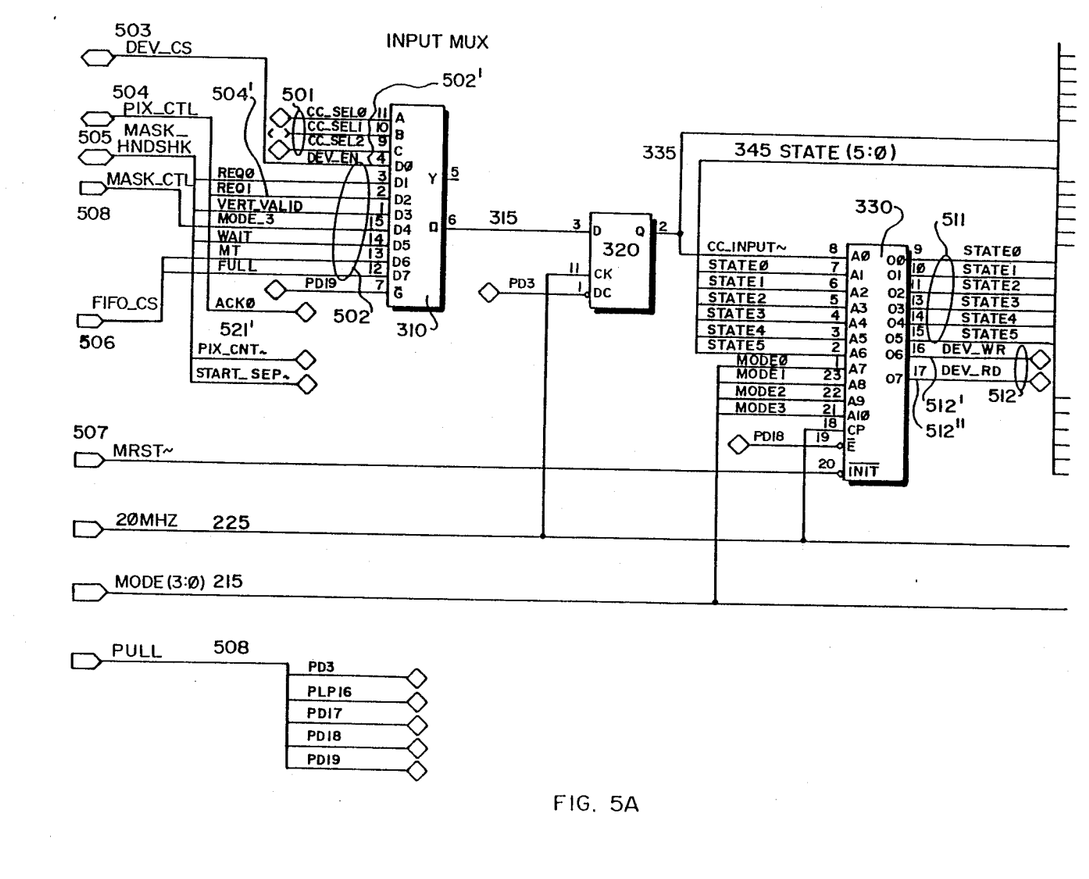
FIG. 5A is a partial schematic diagram of the state machine portion of the illustrative embodiment of the invention.
Figure 5B:
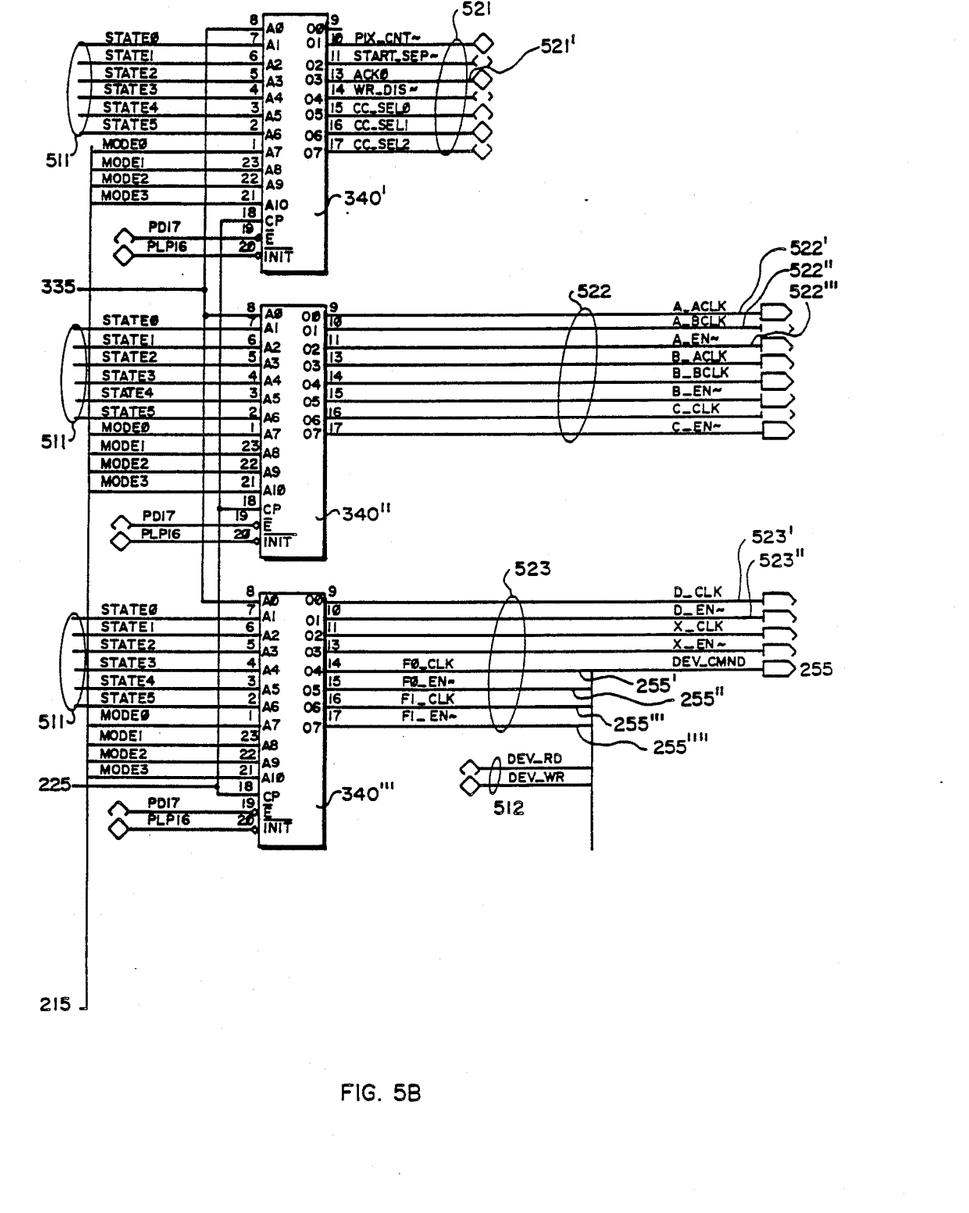
FIG. 5B is a continuation schematic diagram of a portion of the state machine portion of the illustrative embodiment of the invention.

Referring to FIG. 4A, the condition code 43 is used in conjuction with the 4-bit mode 41 set on lines 215 (FIGS. 5A and 5B) and a six-bit state code 42 to determine an address 40 within the memory maps, exemplified by FIG. 4B, of the 2KX8 registered PROMs 330, 340', 340", and 340'" used in the illustrative embodiment (FIGS. 5A and 5B). The PROMs are easily programmable using standard techniques. The contents of a given memory location in PROM 330, used as a state generator, directly specifies the current state. The contents of a given memory location of PROMs 340', 340", and 340'", used as output decoders, are used directly, bit-by-bit, as control signals. Thus, each clock pulse results in direct output, allowing for very high speed operation.

The illustrative embodiment of the invention is now analyzed in detail. With reference to FIG. 5A, registered PROM 330 is employed as a state generator, with the new state specified on the six outputs designated 511. These six bits are connected to the inputs of the three decoder PROMs 340', 340", and 340'" (FIG. 5B) to address their contents, resulting in appropriate output signals respectively on lines 521, 522, and 523. The six bits are also returned to the input of 330 to specify the present state, which, along with the mode selected on lines 215 and the condition code on line 335, are the inputs for the generation of the next state. In this implementation, PROM 330 also has outputs 512, which control the functions of the FIFO buffer 120 (FIG. 1), shown in further detail in FIG. 5E.

Still referring to FIG. 5A, the condition code is selected by the input multiplexer 310 from among eight inputs 502 according to the 3-bit condition code select signals on lines 501, which are outputs from output decoder 340'. Inputs 502 include the device enable signal line 502' and the request signal line 502". The device enable signal on line 502' is set by the system software when initialization has taken place. The request signal on line 502" is sent by the input/output device with each transmission of data.

Other possible condition codes in the implemention shown in FIG. 5A include auxiliary requests on line 504', subline (for multiple separation outputs) start signals on line 504, and diagnostic control signals on lines 506. Again, these are selected by multiplexer 310 according to the condition code select signal 501 within an appropriate state sequence.

Also shown in FIG. 5A are the pull-up and pull-down lines 508. Acknowledgement (used for asynchronous transmission) is made via lines 521' and 504. The master reset line 507 is used to initialize the state generator 330 to state 0 and to select the device enable signal 502' as the condition code input 315 at multiplexer 310. Other lines on 504 to the input/output device are used to transmit data for diagnostics and the pixel counter used by the system to determine the size of the mask or cropping of the image (and thus the length of the scan).

Output lines 522 and 523 from output decoders 340" and 340'" respectively control latching on latches 210, 220, 230, 240, and 250 (FIGS. 5C and 5D), and FIFO buffer 120 (FIG. 1). For example, lines 522' and 522" strobe bidirectional latch 210 to latch data from data bus 265 and input/output data bus 235, respectively, for data flow in opposite directions. The direction signal 506' (FIG. 5C), originating in another portion of the drum scanner interface 110 (FIG. 1), selects the direction of transmission from latch 210. Line 522'" is used to raise the impedance of latch 210 to effectively take the latch off data buses 235 and 265, and when negated, is used, with the direction signal 506, to enable transmission in the selected direction.

Figure 5C:
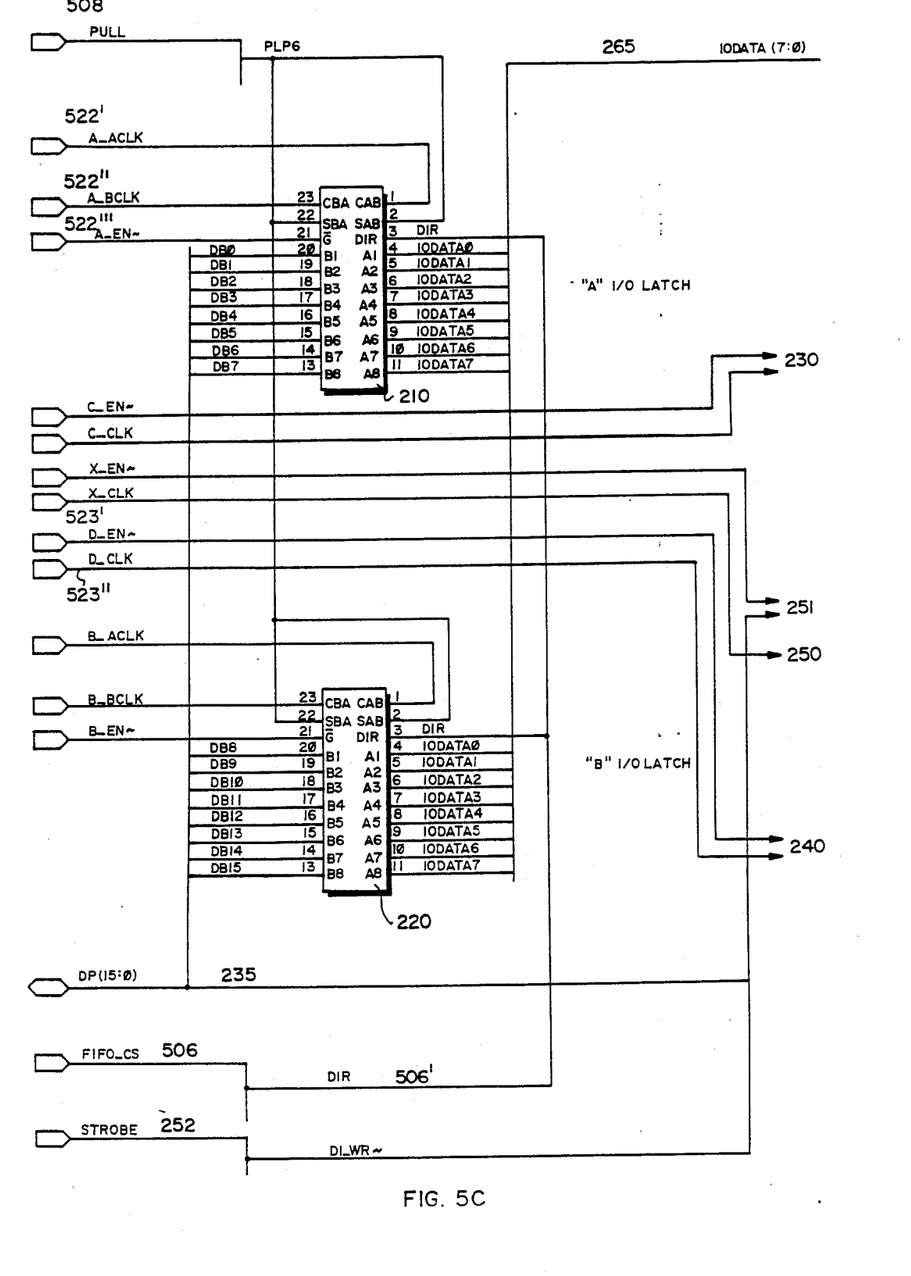
FIG. 5C is a partial schematic diagram of the latch system used in the illustrative embodiment of the invention.

Similarly, line 523' is used to take latch 240 off data bus 265 and, when negated, enables transmission of the contents of latch 240 on data bus 265. There is only one clock line 523" for the uni-directional latch 240, controlling latching from the input/output data bus 235. Line 252 in FIG. 5C is used for diagnostic purposes.

FIG. 5E is a block diagram of the FIFO buffer used in the illustrative embodiment. A FIFO memory 380 of 32KB is organized into 16K addresses of 16 bits, allowing 16-bit parallel transfer on system bus 385, which connects with other portions of the drum scanner interface 110, such as disk drive 130 (FIG. 1). Two FIFO registers or latches are included, FIFO latch 350 corresponding to the high byte or 8 bits of a particular memory location and FIFO latch 360 for the low byte, which are read to and from memory 380 over lines 355 and 365 respectively upon command from FIFO controller 370. The controller 370 responds to read and write signals on lines 512" and 512' respectively from the state generator 330 (FIG. 5A). FIFO latches 350 and 360 are clocked respectively by signals on lines 255''' and 255' from PROM output decoder 340'' (FIG. 5B) to accept data from the 8-bit internal bus 265. Lines 255'''' and 255'', when negated, respectively enable transmission of data from latches 350 and 360 over lines 355 and 365 to the FIFO memory 380.

Figure 6A:
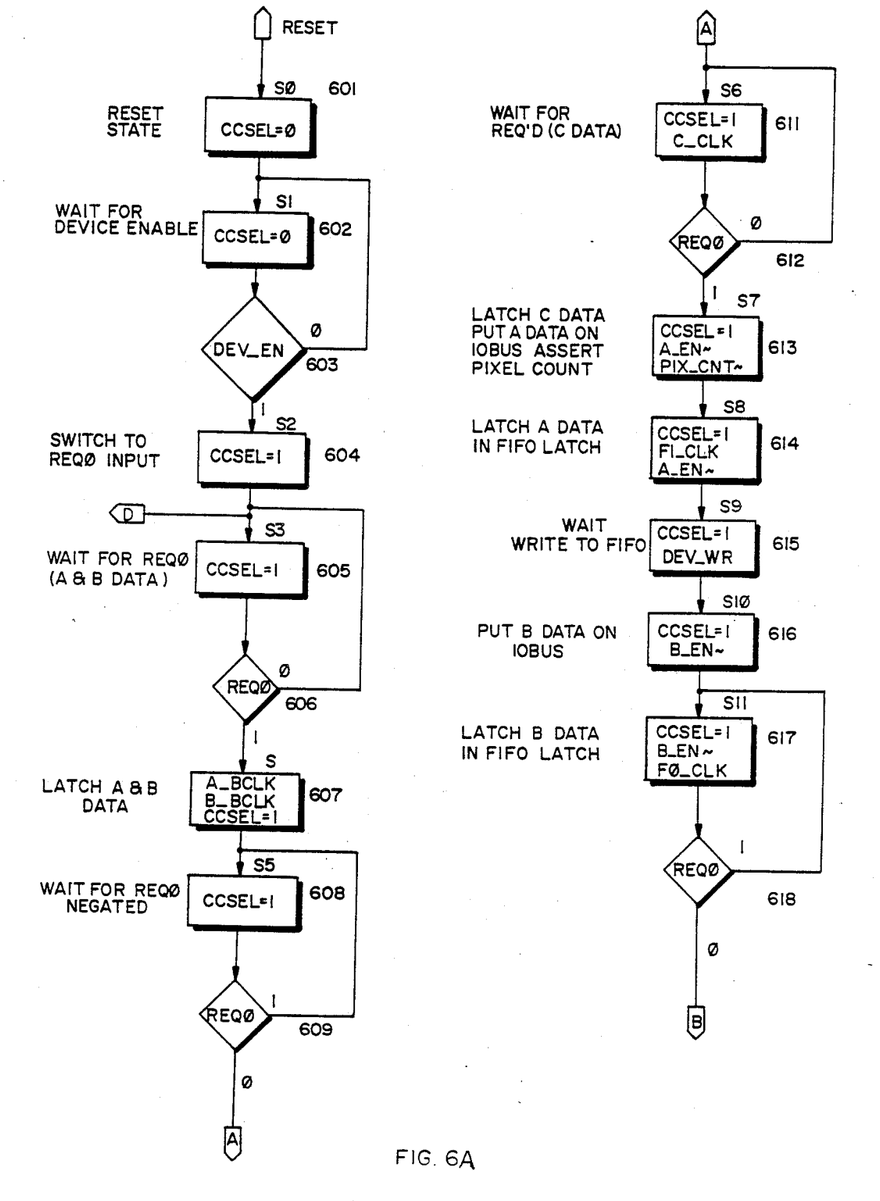
FIG. 6A outlines a portion of the flow of an exemplary state sequence used in the illustrative embodiment of the invention.
Figure 6B:
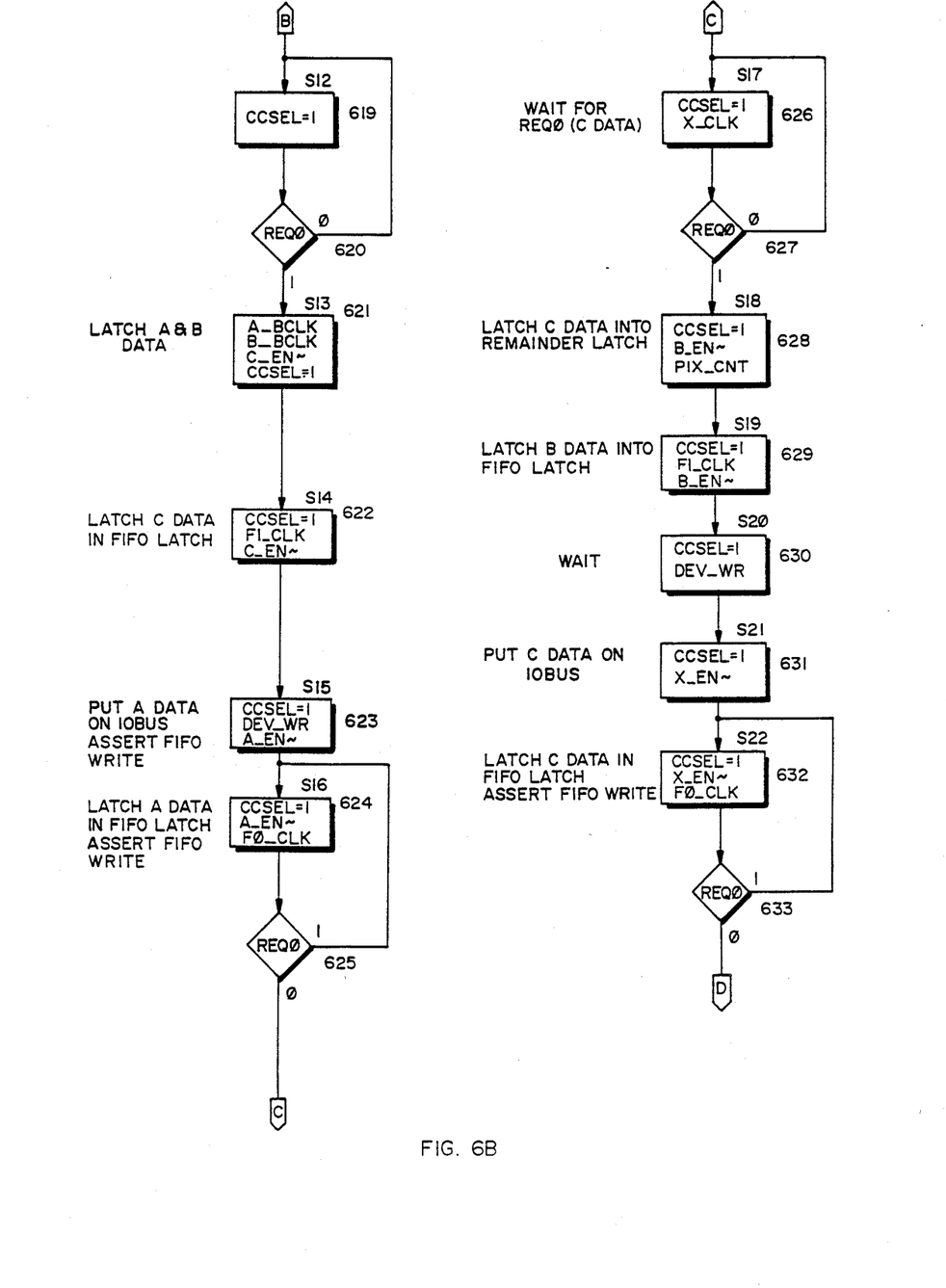
FIG. 6B outlines the continuation of the flow of the exemplary state sequence.

FIGS. 6A and 6B show a sample state sequence for input of R, G, and B data from input device 101 (FIG. 1). Referring first to FIG. 6A, state 601 (S0) is the reset state, with condition code select code at lines 501 equal to 0 at multiplexer 310, thereby selecting the device enable signal 502' in FIG. 5A. State 601 results in state 602 (S1), selected at lines 511 at the state generator 330 (FIG. 5A) at the next clock pulse. State 602 and branch 603 form a loop waiting for the device enable signal 502'. When the signal is received, the condition code select signal on lines 501 switches to 1, selecting the data transfer request signal on line 502'' as the condition code. State 605 (S3) and branch 606 form a loop waiting for a request signal.

Figure 5D:
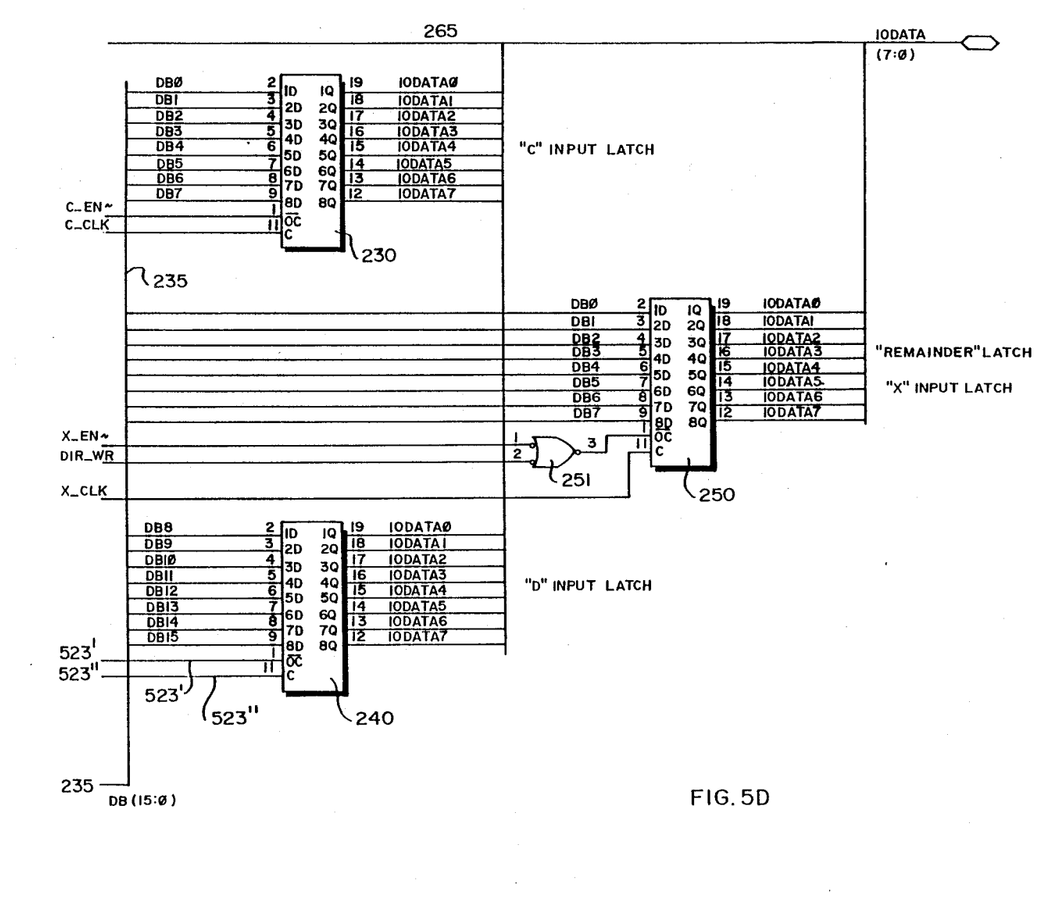
FIG. 5D is a continuation schematic diagram of the latch system used in the illustrative embodiment of the invention.
Figure 5E:
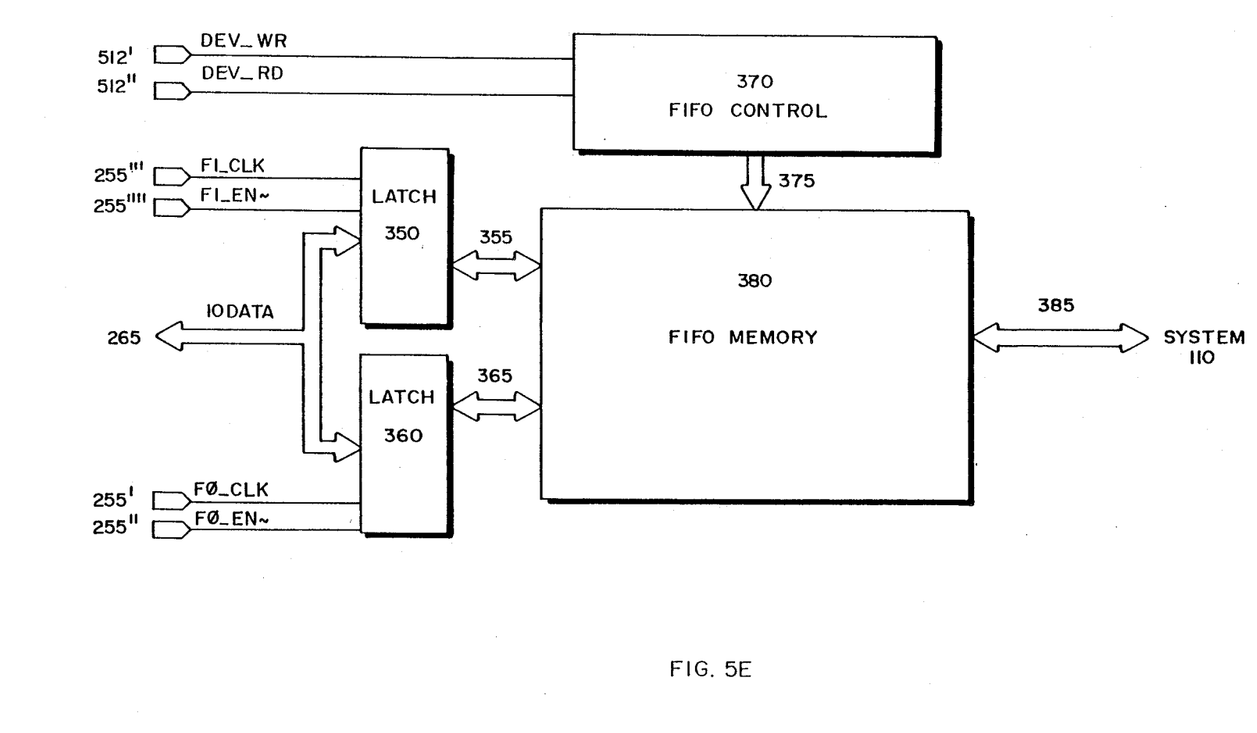
FIG. 5E is a block diagram of the FIFO buffer used in the illustrative embodiment of the invention.

When the signal is received, state 607 (S4) latches the R and G data into latches 210 and 220 (FIG. 5D). Then state 608 (S5) and branch 609 form a loop waiting for the request to be negated. When that condition occurs, state 611 (S6) and branch 612 form a loop waiting for a request on line 502'' corresponding to the B value.

When the signal is received, state 613 (S7) latches the B value into latch 230 and puts the R value in latch 210 on bus 265. State 614 (S8) latches the R value into FIFO latch 350 (FIG. 5E). State 615 (S9) initiates writing from FIFO latches 350 and 360 to the FIFO memory 380 (which is delayed and thereby captures the contents of latch 360, which are subsequently latched in). State 616 (S10) puts the G value in latch 220 on bus 265. State 617 (S11) latches the G value into the FIFO latch 360 (FIG. 5E) (and is captured by the FIFO write operation previously initiated), and with branch 618 form a loop waiting for the request line 502'' to be negated.

When this happens, referring to FIG. 6B, state 619 (S12) and branch 620 form a loop waiting for a request on line 502'' corresponding to the R and G values for a new pixel. Upon receipt of the signal, state 621 (S13) latches the new R and G data into latches 210 and 220 (FIG. 5D) respectively and puts the B value for the previous pixel, still in latch 230, on bus 265. State 622 (S14) then latches the B value into the FIFO latch 350. State 623 (S15) puts the new R value on bus 265. State 624 (S16) latches the new R value into FIFO latch 360, initiates writing from the FIFO latches 350 and 360 into the FIFO memory 380, and with branch 625 form a loop waiting for the request to be negated. When that has happened, state 626 (S17) and branch 627 form a loop waiting for a request corresponding to the B value of the new pixel.

When the request is received, state 628 (S18) latches the B value into the remainder latch 250 (FIG. 5D) and puts the G value on bus 265. State 629 (S19) latches the G value into the FIFO latch 350. State 630 (S20) initiates the delayed writing from latches 350 and 360 into the FIFO memory 380. State 631 (S21) then puts the B value from the remainder latch (FIG. 5D) on bus 265. State 632 (S21) latches the G value into the FIFO latch 360, which is captured by the already initiated write into the FIFO memory and, with branch 633, form a loop waiting for the request 502'' to be negated. The cycle is then repeated at state 605 (S3).

In the write modes, the state generator 330 gives a FIFO read request on line 512'', and the data is latched into FIFO latches 350 and 360 (FIG. 5E). Data is then put onto internal bus 265 one byte at a time and latched into latches 210 and 220 (FIG. 5D). The pixel formatter then enables the data onto the input/output bus 235 and acknowledges on line 521'.

In the diagnostic mode, test data from the system is put on the data bus 235. The pixel formatter takes the test data and puts in onto the internal bus 265 one byte at a time through each of the latches 210, 220, 230, 240 and 250 according to a diagnostic program. The test data is put into FIFO latches 350 and 360 and then a FIFO write request is given by the pixel formatter.

It should be understood that the above discloses an illustrative embodiment. Different programs are possible which achieve the same control of data flow.

Having described this invention, what is claimed as new and secured by Letters Patent are:

1. In a pictorial information processor/previewer system including at least one input device which digitizes pictorial information in pixel values corresponding to n (greater than zero) colors and including intermediate storage means for pixel values received from the input device, an interface between the input device and the intermediate storage means comprising:

a. a first data bus suitable for transmitting pixel values from the input device;
   b. a second data bus suitable for transmitting pixel values to the intermediate storage means;
   c. n+1 latches connected at their inputs to the first data bus and at their outputs to the second data bus and each capable of storing a pixel value received from the input device on the first data bus and capable of transmitting that pixel value on the second data bus to the intermediate storage means; and
   d. a multi-mode, fully programmable state machine connected to each latch, which is programmed to control the storage and transmission operations of the individual latches according to sequences associated with each mode, which is clocked at a clock rate several times greater than the rate of pixel value transmission on the first data bus, and the mode of operation which is selectable by electrical signal.

2. The interface of claim 1 further comprising means for recognizing and acknowledging data transmission handshake protocols in connection with transmission of data on the first data bus.

3. The interface of claim 2 wherein the data transmission handshake protocols are transmitted to and from the input device on lines separate from the data bus, wherein the data transmission requests are recognized as inputs to the state machine and acknowledgements are outputs from the state machine.

4. The interface of claim 3 wherein the state machine comprises registered programmable read-only memories.

5. The interface of claim 4 wherein one of the registered programmable read-only memories is employed as a state generator and one or more are employed as output control decoders.

6. In a pictorial information processor/previewer system including at least one graphic input device which digitizes pictorial information in pixel values corresponding to n (greater than zero) colors, at least one graphic output device which writes according to processed pixel values, and an intermediate storage means for pixel values received from the input device or to be transmitted to the output device, an interface between the intermediate storage means and the input and output devices comprising:

a. a first data bus suitable for transmitting pixel values from or to the input and output devices;

b. a second data bus suitable for transmitting pixel values to or from the intermediate storage means;

c. n+1 latches connected at their inputs to the first data bus and at their outputs to the second data bus and each capable of storing a pixel value received from the input device on the first data bus and transmitting that pixel value to the intermediate storage means on the second data bus;

d. at least one latch connected at its inputs to the second data bus and at its outputs to the first data bus and capable of storing a pixel value received from the intermediate storage means on the second data bus and transmitting that pixel value to the output device on the first data bus; and e. a multi-mode, fully programmable state machine connected to each latch, which is programmed to control the storage and transmission operations of the individual latches according to sequences associated with each mode, which is clocked at a clock rate several times greater than the rate of pixel value transmission on the first data bus, and the mode of operation which is selectable by electrical signal.

7. The interface of claim 6 wherein one or more of the n+1 latches is capable of bi-directional operation and serves as the additional latch which receives a pixel value from the intermediate storage means on the second data bus and transmits that pixel value to the output bus on the first data bus.

8. The interface of claim 7 further comprising means for recognizing and acknowledging data transmission handshake protocols in connection with transmission of data on the first data bus.

9. The interface of claim 8 wherein the data transmission handshake protocols are transmitted to and from the input device on lines separate from the data bus, wherein the data transmission requests are recognized as inputs to the state machines and acknowledgements are outputs from the state machine.

10. The interface of claim 9 wherein the state machine comprises registered programmble read-only memories.

11. The interface of claim 10 wherein one of the registered programmable read-only memories is employed as a state generator and one or more are employed as output control decoders.

* * * * *